United States Patent

[11] 3,563,149

[72] Inventors Minoru Suzuki
 Tokyo-to,
 Naoyuki Uno, 001-Machi, Iruma-gun, and
 Tadazumi Sakazaki, Tokyo-to, Japan
[21] Appl. No. 735,043
[22] Filed June 6, 1968
[45] Patented Feb. 16, 1971
[73] Assignee Asahi Kogaku Kogyo Kabushiki Kaisha
 Tokyo-to, Japan
[32] Priority Mar. 2, 1968
[33] Japan
[31] 43/13339

[54] LIGHT-MEASURING SYSTEM EMPLOYING VIEWER SURPLUS LIGHT
 12 Claims, 8 Drawing Figs.
[52] U.S. Cl. ................................................. 95/42, 95/10
[51] Int. Cl. ........................................... G03b 19/12
[50] Field of Search ...................................... 95/42, 10 (C)

[56] References Cited
UNITED STATES PATENTS
3,332,330 7/1967 Broschke et al. ............. 95/42
3,347,143 10/1967 Jacobs ......................... 95/42
3,465,660 9/1969 Trankner et al. ............. 95/42
FOREIGN PATENTS
1,274,867 9/1966 Germany ...................... 95/42

Primary Examiner—Samuel S. Matthews
Assistant Examiner—Richard L. Moses
Attorney—Stanley Wolder ABSTRACT: A through the lens light-measuring system includes a light-transmitting surface at the mirror-reflected focal plane of a reflex camera, a pentaprism having a bottom face confronting the light-transmitting surface, and an eyepiece directed to the prism rear face. Opposite side sections of the prism face are transparent and outside the viewing area of the eyepiece and an upwardly facing photocell is located proximate the bottom edge of each side section and a prism of other reflector directs the image rays reflected from the prism roof through the side sections onto the photocells. One of the photocells is provided with a lens for focusing part of the image. In an alternative form the photocells face the prism rear face on opposite sides of the eyepiece and are oblique to the optical axis to compensate for light intensity differences consequent to differences in angles between the photocell and the observed image, one of the photocells being provided with a focusing lens for part of the image.

INVENTORS
MINORU SUZUKI
NAOYUKI UNO
TADAZUMI SAKAZAKI
BY
Stanley Wolder
ATTORNEY

PATENTED FEB 16 1971

INVENTORS
MINORU SUZUKI
NAOYUKI UNO
BY TADAZUMI SAKAZAKI
Stanley Wolder
ATTORNEY 3,563,149

LIGHT-MEASURING SYSTEM EMPLOYING VIEWER SURPLUS LIGHT

BACKGROUND OF THE INVENTION

The present invention relates generally to improvements in light-measuring systems and it relates particularly to an improved single lens reflex camera through the lens light-measuring system.

There have been employed and proposed many forms of through the lens light-measuring systems for single lens reflex cameras in which a photoelectric element is positioned at the rear face or a reflecting face of the viewing system pentaprism. These systems, however, possess numerous drawbacks and disadvantages. In many forms of such systems measuring inaccuracies are experienced as a consequence of light entering the viewing eyepiece reaching the photoelectric element.

In order to reduce the entry of light from the eyepiece to the minimum, various expedients have been proposed which have resulted in a large-sized pentaprism section as well as in an upper cover formed larger than that of the conventional camera of a similar type. Moreover, when the viewfinder's optical system has been provided with a translucent mirror, the reflected light has been reduced and consequently the luminosity in the viewfinder has been lowered. In order to overcome the above disadvantages, the present invention contemplates an improved light-measuring system wherein surplus light at oppositely inclined frontal end surfaces of a pentaprism is utilized for achievement of exposure metering or light measurement so that the upper cover need not be significantly enlarged and exposure metering may be effected without reduction of the luminosity in the viewfinder.

Such a metering system by surplus light conventionally requires a pair of closely matched photoelectric elements, and therefore the metering system of this type is accompanied with various difficulties for its construction and production control. According to the present invention, the exposure-metering operation can be achieved with a single photoelectric element and, when a pair of photoelectric elements are used, a condensing or focusing lens is located in front of one of the photoelectric elements so as to effect the spot exposure metering and the pair of photoelectric elements may be electrically switched from one to another to effect both the average exposure metering and the spot exposure metering.

SUMMARY OF THE INVENTION

A principal object of the present invention is to provide an improved light-measuring system.

Another object of the present invention is to provide an improved camera through the lens light-measuring system.

Still another object of the present invention is to provide an improved through the lens light-measuring system in reflex cameras employing pentaprism viewing systems without any increase in the size of the camera.

A further object of the present invention is to provide a camera through the lens light-measuring system in which average image brightness as well as image spot brightness may be measured.

Still a further object of the present invention is to provide a light-measuring system of the above nature characterized by its accuracy, reliability, versatility, simplicity, compactness and low cost.

The above and other objects of the present invention will become apparent from a reading of the following description taken in conjunction with the accompanying drawings which illustrate preferred embodiments thereof.

A feature of the present invention resides in the exposure-metering operation being effected by the use of surplus light that is light not employed for any other functions such as viewing, reflected from the opposite frontal end surfaces of a pentaprism downward to a photoelectric element whereby the exposure-metering system may be easily incorporated into a conventional camera body without any increase in size.

Another feature is represented by an arrangement in which a through the lens exposure-metering operation can be achieved without any reduction of the luminosity of the observed in the viewfinder through use of the surplus light.

Another feature of the invention is that the photoelectric means may be a single element instead of being a pair of elements as is usually required in the utilization of the surplus light for measurement, and thereby the production control of the photoelectric element is simplified, the usual difficulties in construction and adjustment thereof may be eliminated, and the production cost thereof may be considerably reduced.

A further feature is an arrangement wherein, since the exposure metering operation can be achieved by the use of a single photoelectric element, a pair of photoelectric elements may be incorporated into a camera, of which the one is employed for narrow angle reading (spot reading) and the other is employed for average image light reading, and thereby the desired metering can be selectively effected as the both elements may be electrically switched.

In a sense the present invention contemplates the provision of a camera through the lens light-measuring system comprising viewing means including a pentaprism having a bottom face exposed to the image-forming light rays of the camera objective lens, a transparent rear face, a reflector front face and a reflector top surface and an eyepiece directed toward said pentaprism rear face, said pentaprism front face having a transparent section offset from the area of said front face which intercepts and reflects the light rays from the viewed image or picture area which enters the pentaprism bottom face to said eyepiece, and light-measuring means including a photosensitive element exposed to light rays entering said pentaprism bottom face and reflected by said top surface through said front face transparent section.

A pair of transparent sections are advantageously provided at opposite sides of the pentaprism front face and a photocell is positioned adjacent the lower edge of each section. A prism, mirror, or the like directs the rays inflected by the prism roof surface through the transparent section to the photocells. A lens is associated with one of the photocells to expose it to the rays of a predetermined limited area of the image.

The present invention also contemplates positioning the photocell at an oblique angle to the optical axis of the projected focused image which is viewed through the pentaprism and which image functions as a secondary light source, whereby to compensate for the varying proportion of light reaching the photocell from different areas of the image. The photocell is offset from the optical axis and may receive light through the front face transparent section or other suitable transparent section offset from the eyepiece viewing angle, such as at the pentaprism rear face. A lens may be provided to limit the area of the image to which the photocell is exposed.

DESCRIPTION OF THE PREFERRED EMBODIMENT

Figure 2:
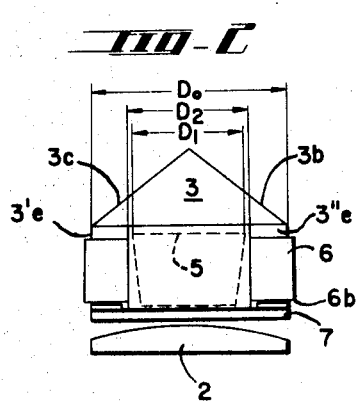
FIG. 2 is a front view of the optical system shown in FIG. 1.
Figure 1:
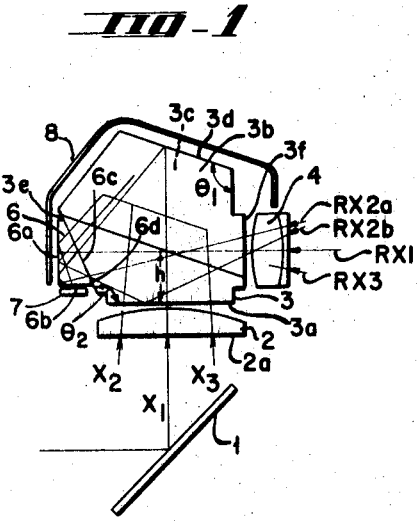
FIG. 1 is a side elevational view illustrating a viewfinder's optical system of a single-lens reflex camera having an exposure-metering or light-measuring system according to the present invention.

Referring to the drawing, the viewfinder's optical system of a singleglens reflex camera consists of a mirror 1, an image glass 2 having a focal plane 2a located in the focal plane of the camera lens as reflected by the mirror 1, a pentaprism 3 and an eyepiece 4. The range or effective image or viewed picture reflecting area of a downwardly rearwardly inclined front reflective surface 3e of the pentaprism 3 as an optical system for exposure metering that corresponds to the effective luminous flux may be shaped as an inversed trapezoid as shown by the dotted line 5 in FIG. 2, of which, $D_1$, the length of the longest side, will be given as $D_1 = 0.6 D_o$ under the following condition:

$h = 9$ mm.;
$D_o = 35.5$ mm.;
$\leq \theta_1 = 110°$; and
$\leq \theta_2 = 115°$ :where $h$ designates the height from a bottom surface 3a of the pentaprism to the optical axis of the eyepiece 4, $D_o$ the width of the pentaprism, $\leq \theta_1$ the angle included between a rear transmissible surface 3f and a roof edge 3d of the pentaprism and $\leq \theta_2$ the angle included between the bottom surface 3a and the frontal reflective surface 3e of the pentaprism.

The range of the frontal reflective surface 3e to be processed as the reflective surface corresponding to the effective luminous flux, therefore, may be said $D_1$ including any possible allowable error in manufacture. This range is designated in the drawing as $D_2$. Right and left margins 3'e and 3"e beyond this range $D_2$ may be transmissible surfaces without reduction of the luminosity in the viewfinder or interference with the observation of the full image. A reflection prism 6 having a substantially vertical reflective surface 6A, a bottom surface 6b and an inclined surface 6c, the last two of which are transmissible surfaces, is located at said transmissible surfaces 3'e and 3"e, and a photoelectric element 7 faces the bottom surface 6b of the reflecting prism.

With such an arrangement, light X1 and light X2 respectively from the upper and middle parts of the viewed object, after entry through the bottom surface 3a of the pentaprism, are successively reflected by the roof-shaped reflective surfaces 3b and 3c, or 3c and 3b, respectively, and finally reflected by the reflective surface 6a of the reflecting prism 6 downward to the photoelectric element 7, while light X3 from lower part of the object, after entry through the bottom surface 3a of the pentaprism is successively reflected by the roof shaped reflective surfaces 3b and 3c, or 3c and 3b of the pentaprism, and finally passes through the frontal transmissible surfaces 3'e and 3"e directly to the photoelectric element 7.

Figure 3:
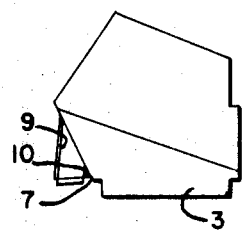
FIG. 3 is a side view of a modified form of the exposure metering system according to the present invention.
Figure 4:
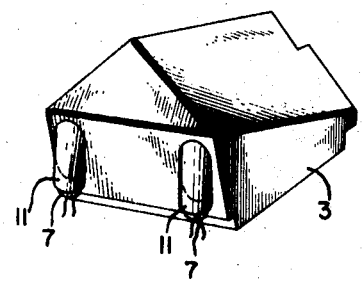
FIG. 4 is a perspective view of a further form of the exposure-metering system according to the present invention.

As for the stray light entering through the eyepiece, light RX1 entering in parallel with the optical axis, after following its path in the pentaprism 3, is directly reflected by the reflective surface 6a of the reflecting prism toward the eyepiece side and diffused back with a certain angle. Light RX2a that obliquely enters down with an angle through the eyepiece is partially reflected by the reflective surface 6a of the reflecting prism and totally reflected by the bottom surface 6b thereof back to the eyepiece side, while light RX2b with another angle is totally reflected by the bottom surface 3a of the pentaprism and diffusely reflected by the reflective surface 6a of the reflecting prism. Furthermore, light RX3 that obliquely enters up through the eyepiece, after following its path in the pentaprism 3, is reflected back by the reflective surface 6a of the reflecting prism obliquely up to the eyepiece side and diffused. All of these stray light rays are successively reflected by the surfaces in the viewfinder's optical system and do not directly impinge on the photoelectric element 7 so that any possible error in exposure metering due to the entry of stray light through the eyepiece is reduced to the minimum. The influence of the stray light may be further minimized by providing the reflecting prism 6 with a shielding surface 6d. In the aforesaid optical system for exposure metering, a modified arrangement may be employed in which an aperture is provided between the reflecting prism 6 and the frontal reflective surface 3c of the pentaprism. In FIG. 3 there is illustrated a modified embodiment wherein a reflecting mirror 9 is located in front of the pentaprism front face transmissible surfaces 3'e and 3"e at acute angles thereto and the photoelectric element 7 is positioned under said reflecting mirror 9 and a shielding plate 10 extends upwardly from the rear edge of the photoelectric element 7 to the pentaprism front face. The operation by this modified embodiment is so like that employing the reflecting prism 6 that its description in detail may be omitted. However, the effective surface of the photoelectric element 7 is preferably somewhat inclined, as shown in FIG. 3, in order to prevent a proportion of the stray light that has passed through the frontal transmissible surfaces of the pentaprism from refracting and directly reaching the effective surface of the photoelectric element. FIG. 4 shows a further modification according to said arrangement, wherein the reflecting prism 6 is replaced by a cylinder 11 of which the inner surface is formed as a reflecting surface with treatments such as gilding and the photoelectric element 7 is located under said cylinder 11 in a manner similar to that described above.

Figure 5:
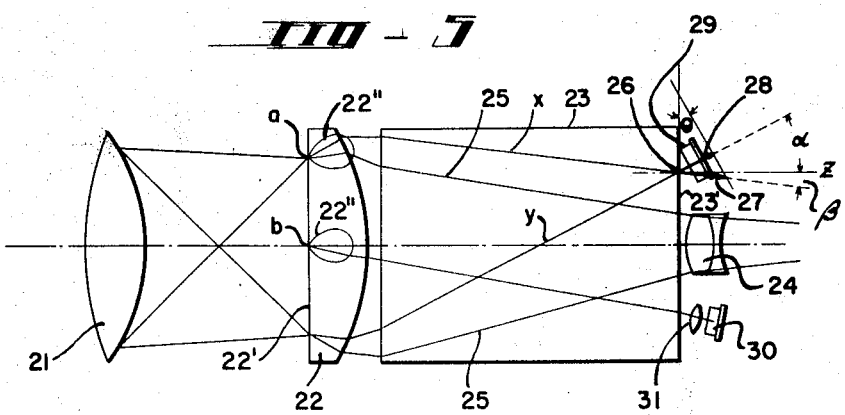
FIG. 5 is a developed plan view illustrating the relative positions between photoelectric elements and a pentaprism included in the exposure metering system according to the invention.
Figure 8:
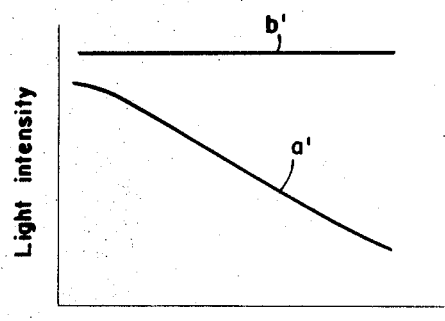
FIG. 8 is a graph representing the luminosity on photoelectric surface when a pair of photoelectric elements are used.

Now referring to FIG. 5, light rays having passed through and directed by an objective 21 on to a condenser lens 22 has an intensity distribution represented by a line 22" with an image diffusion surface 22' as a secondary light source on said image diffusion surface, that is, the light rays radially diffused from a point $a$ has a luminosity of the object equal to the length defined by an ellipse 22'". Main light rays 25 of the aforesaid diffused light rays are condensed, by way of parallel glasses 23 having light course length equivalent to the pentaprism, to the eyepiece 24. The curvature of the condenser lens 22 is determined for a greater luminosity of the visible image. Under such a condition, light rays $x$ and $y$ passing through an end surface 23' of the parallel glasses 23 that is away from the optical axis at a position 26 may be represented by arrows having respective lengths in proportion to their luminosities. If a photoelectric element 29 were located at said position 26 with its photosensitive face parallel with the said end surface 23' of the parallel glasses 23, the luminosity on the effective surface of the photoelectric element 29 may be represented by a line $a'$ shown in FIG. 8 (provided that the luminosity of the object is uniform). Namely, the light intensity is gradually reduced from one side of said effective surface to other side thereof. For compensation of such a gradual variation, a pair of photoelectric elements are symmetrically provided so as to obtain an average luminosity represented by a line $b'$ by mutual compensation of said pair of photoelectric elements. According to the present invention, however, the photoelectric element 29 corresponding to said position 26 is located obliquely relative to said end surface 23' of the parallel glasses 23 so as to obtain an uniform action of said photoelectric element 29. In other words, luminosities with respect to positions $a$ and $b$ on the image diffusion surface 22' may be uniform by selecting $\theta$ of which value is obtained from equation as below:

$$A \cos (\theta - 2) = B \cos (\beta + \theta)$$

$$\theta = \tan^{-1} \frac{B \cos \beta - A \cos \alpha}{A \sin \alpha + B \sin \beta}$$

where B designates a luminosity corresponding to arrow 27, A that corresponding to arrow 28, $\theta$ an angle included between the end surface of the parallel glasses and the photoelectric element, $\alpha$ an angle included between $y$ and a line $Z$ perpendicular to said end surface 23' at the position 26, $\beta$ an angle included between $Z$ and $x$. The photoelectric element 29, of course, can receive light rays having a luminosity other than those represented by arrows 27 and 28 in FIG. 5 and it has been found that the photoelectric element 29 is practically useful although somewhat different from supposed photoelectric elements corresponding to other positions on the image diffusion surface 22' in the value of $\theta$.

Thus an exposure metering or light measurement is effectively achieved with a single photoelectric element instead of a pair thereof in through the lens exposure metering system utilizing a surplus light in the pentaprism by positioning said single photoelectric element obliquely relative and fronting to the optical axis of said pentaprism.

Figure 6:
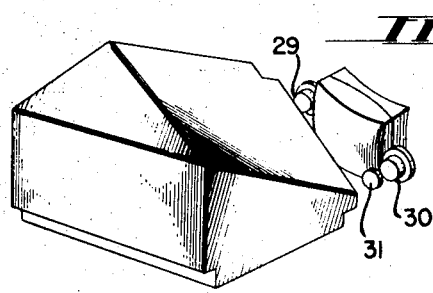
FIGS. 6 and 7 are perspective views corresponding to FIG. 5 with respect to the respective modifications.
Figure 7:
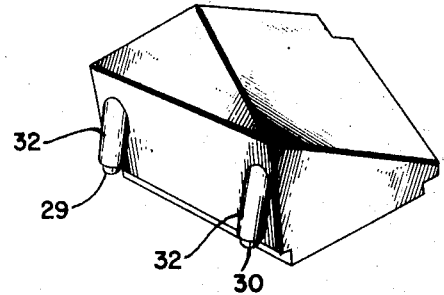

Also with the arrangement as described above, a condenser lens 31 may be provided such that said lens 31 is focused relative to said image diffusion surface 22' as seen in FIG. 5 to direct a predetermined section of the image on said image diffusion surface 22' to the photoelectric element 29. FIG. 6 shows a modification wherein the principle as illustrated in FIG. 5 is achieved by a pair of photoelectric elements 29 and 30 provided on opposite sides of the eyepiece confronting the rear face of the viewer pentaprism, while FIG. 7 shows another modification wherein reflecting prisms or reflector or reflector devices 32 and 32 are provided on opposite sides of the front surface of the pentaprism for reflecting the image further downward into photoelectric elements 29 and 30, of which the former is for average exposure metering and the latter for spot exposure metering, the photoelectric elements 29 and 30 being inclined to the optical axis as described above.

It will be obvious from the foregoing description that, according to the present invention, the stray light from eyepiece can be effectively cut off, the incorporation can be achieved without any enlargement of the conventional size of cover, and the average and spot exposure meterings may be selectively done since the exposure metering operation can be accurately achieved with a single photoelectric element.

While there have been described and illustrated preferred embodiments of the present invention, it is apparent that numerous alterations, omissions and additions may be made without departing from the spirit thereof.

We claim:

1. A camera through the lens light-measuring system comprising viewing means including a pentaprism having a bottom face exposed to the image formed by the camera objective lens, a transparent rear face, a reflector front face and a reflector top surface and an eyepiece directed toward said pentaprism rear face, said pentaprism front face including an area which intercepts and reflects the light rays from said image to said eyepiece and a transparent section offset from said intercept area, and out of the path of light rays between said image and eyepiece and light-measuring means including a photosensitive element exposed to light rays entering said pentaprism bottom face and reflected by said top surface through said front face transparent section.

2. The light-measuring systems of claim 1 wherein said transparent section is laterally offset relative to said front face intercept area.

3. The light-measuring system of claim 1 wherein and said photosensitive element is directed upwardly and is positioned below said transparent section and said light measuring means includes means directing said light rays reflected by said top surface through said transparent action onto said photosensitive element.

4. The light-measuring systems of claim 3 wherein said light ray directing means comprises a light deflecting prism proximate said front face transparent section and including a rear face adjacent said transparent section, a bottom face adjacent said photosensitive element and a front face reflecting said light rays entering said light deflecting prism rear face through said light deflecting prism bottom face onto said photosensitive element.

5. The light-reflecting system of claim 3 wherein said light ray-directing means comprise a mirror positioned forward of and facing said transparent section and forming an acute angle therewith.

6. The light-reflecting system of claim 1 including a lens positioned between said pentaprism front face transparent sections and said photosensitive element and directing the rays from a limited predetermined area of said viewed picture area onto said photosensitive element.

7. The light-measuring system of claim 1 including a pair of said transparent sections laterally offset on opposite sides of said pentaprism front face intercept area, one of said light-measuring means being associated with each of said transparent areas and each including one of said photosensitive elements positioned below a respective transparent section and means for directing said light rays reflected by said pentaprism top surface through said transparent section onto respective photosensitive elements, and means including a lens positioned between one of said photosensitive elements and a respective transparent section for directing the rays from a limited predetermined area of said viewed picture area to said respective photosensitive element.

8. The light-measuring system of claim 1 wherein said photosensitive element has a sensitive face at an oblique angle with the optical axis of said image forming light rays as directed through said prism and said pentaprism front face.

9. A camera through the lens light-measuring system comprising a viewer including a surface positioned in a focal plane of the camera lens and upon which an image is focused and a pentaprism having a face directed toward said image, a first photosensitive element exposed to said image through said pentaprism and having a sensitive face offset from and at an oblique angle with the optical axis of said image through said pentaprism to compensate for variations in light from different areas of said image incident on said sensitive face consequent to said offset from said optical axis, a second photosensitive element spaced from said other photosensitive element and exposed to said image through said pentaprism and having a sensitive face offset from and at an oblique angle with the optical axis of said image through said pentaprism to compensate for variations in light from different areas of said image incident on said sensitive face, and a lens positioned to direct the rays from a limited predetermined area of said image on one of said photosensitive elements.

10. A camera through the lens light-measuring system comprising a viewer including a surface positioned in a focal plane of the camera and upon which an image is focused and a pentaprism having a bottom first face exposed to said image and second faces including a transparent rear face, a reflector front face and a reflector top face, and an eyepiece directed toward said pentaprism rear face, one of said pentaprism second faces including an area which intercepts light rays from said image to said eyepiece and a transparent section offset from said intercept area and located out of the path of light rays between said image and eyepiece, and a photosensitive element exposed to light rays from said image incident on said pentaprism first face and transversing said transparent section and having a sensitive face offset from and at an oblique angle with the optical axis of said image through said pentaprism to compensate for variations in light from different areas of said image incident on said sensitive face consequent to said offset from said optical axis.

11. The light-measuring systems of claim 10 wherein said pentaprism includes a rear transparent exit face, and comprising an eyepiece directed toward said rear face along said optical axis, said photosensitive element being laterally offset from and outside the angle of vision of said eyepiece and having a sensitive surface facing said pentaprism rear face and inclined toward said optical axis.

12. The light-measuring system of claim 10 including a lens positioned to direct the rays from a limited predetermined area of said image onto said photosensitive element.